US006426509B1

(12) United States Patent
Itako

(10) Patent No.: US 6,426,509 B1
(45) Date of Patent: Jul. 30, 2002

(54) OPTICAL PAPER SHEET CHECKING APPARATUS HAVING AN AUTOMATIC ADJUSTMENT FUNCTION

(75) Inventor: Eiji Itako, Sakado (JP)

(73) Assignee: Nippon Conlux Co., Ltd., Tokyo (JP)

( * ) Notice: Subject to any disclaimer, the term of this patent is extended or adjusted under 35 U.S.C. 154(b) by 49 days.

(21) Appl. No.: 09/679,490

(22) Filed: Oct. 4, 2000

(30) Foreign Application Priority Data

Oct. 6, 1999 (JP) .......................................... 11-285490

(51) Int. Cl.[7] ................................................ G01N 21/86
(52) U.S. Cl. ..................... 250/559.44; 250/556; 356/71
(58) Field of Search ......................... 250/559.01, 559.4, 250/559.41, 559.44, 559.45, 559.46, 556, 557, 205, 223 R, 214 R; 356/71; 194/207; 209/534

(56) References Cited

U.S. PATENT DOCUMENTS 5,250,813 A * 10/1993 Takahashi et al ........ 250/559.4
5,283,424 A * 2/1994 Acquaviva et al. ......... 250/205

FOREIGN PATENT DOCUMENTS

JP 6215224 A * 8/1994 ............ G07D/7/00

* cited by examiner

*Primary Examiner*—Kevin Pyo
(74) *Attorney, Agent, or Firm*—Koda & Androlia

(57) ABSTRACT

In quantitatively detecting light permeated through or reflected from a paper sheet in order to detect optical characteristics of the paper sheet, an optical paper sheet checking apparatus detects with stability and optimum precision. The optical paper sheet checking apparatus comprises a plurality of optical sensors which output signals obtained by optically detecting a pattern of a paper sheet, the optical sensors comprising light emitting elements and light-receiving elements; a driving unit which supplies a current to the light emitting elements in the plurality of optical sensors in accordance with a control signal; and a controlling unit which, while the paper sheet is not in a predetermined position, (a) supplies a maximum current having a predetermined value to the light emitting elements and thereafter supplies the control signal to the driving unit so as to decrease the supply of current, (b) determines and stores optimum values for each of the plurality of optical sensors, the optimum value being the value of current supplied when the output voltage of the light-receiving elements has changed by a predetermined value in proportion to its value at the maximum current, (c) when the paper sheet is at the predetermined position, supplies the control signal to the driving unit based on each of the optimum values which have been stored, and (d) selectively extracts the detected signals from the optical sensors and outputs detected data representing the pattern of the paper sheet.

6 Claims, 5 Drawing Sheets

OPTICAL PAPER SHEET CHECKING APPARATUS HAVING AN AUTOMATIC ADJUSTMENT FUNCTION

BACKGROUND OF THE INVENTION

1. Field of the Invention

The present invention relates to an apparatus which optically checks paper sheets such as bank notes. In particular, this invention relates to the apparatus which detects permeated light and reflected light by using multiple optical sensors, and carries out a check based on the detected output.

2. Description of the Related Art

In optically checking paper sheets such as, for example, bank notes, a check is carried out to determine whether a pattern printed on the paper surface is correct. In many cases, the paper sheets are checked by using multiple elements. The outputs of these elements must be made constant.

One conventional method of making the outputs constant is to provide a volume to each of the detecting circuits in the elements of the optical sensor, and to match the detecting levels of all the elements by adjusting their volumes.

However, adjustment is extremely complex when there is a great number of elements.

In another conventional method, disclosed for example in Japanese Patent Application No. 61-4819, the sensitivity level of the optical sensor is set at the initial stage in order to determine whether or not a medium exists.

However, this optical sensor only determines whether or not a medium exists. When applied to paper sheets, the optical sensor creates a two-value signal for detecting but cannot create a measuring signal.

SUMMARY OF THE INVENTION

This invention has been realized in consideration of the above points, and aims to provide an optical paper sheet detecting apparatus capable of measuring with stability and optimum precision light which has been permeated through or reflected from a paper sheet in order to detect optical characteristics thereof.

In order to achieve the above objects, the optical paper sheet checking apparatus of this invention comprises a plurality of optical sensors which output signals obtained by optically detecting a pattern of a paper sheet, these optical sensors comprising light emitting elements and light-receiving elements; a driving unit which supplies a current to the light emitting elements in the plurality of optical sensors in accordance with a control signal; and a controlling unit. While the paper sheet is not in a predetermined position, the controlling unit supplies a maximum current having a predetermined value to the light emitting elements. Thereafter, the controlling unit supplies the control signal to the driving unit so as to decrease the supply of current, and determines and stores optimum values for each of the plurality of optical sensors. The optimum value is deemed to be the value of current supplied when the output voltage of the light-receiving elements has changed by a predetermined value in proportion to its value at the maximum current. When the paper sheet is at the predetermined position, the controlling unit supplies the control signal to the driving unit based on each of the optimum values which have been stored, selectively extracts the detected signals from the optical sensors and outputs detected data representing the pattern of the paper sheet.

BRIEF DESCRIPTION OF THE DRAWINGS

FIG. 1 is a diagram showing one example of a circuit constitution of the light-permeating paper sheet checking apparatus which this invention is applied in;

DESCRIPTION OF THE PREFERRED EMBODIMENT

Figure 1:
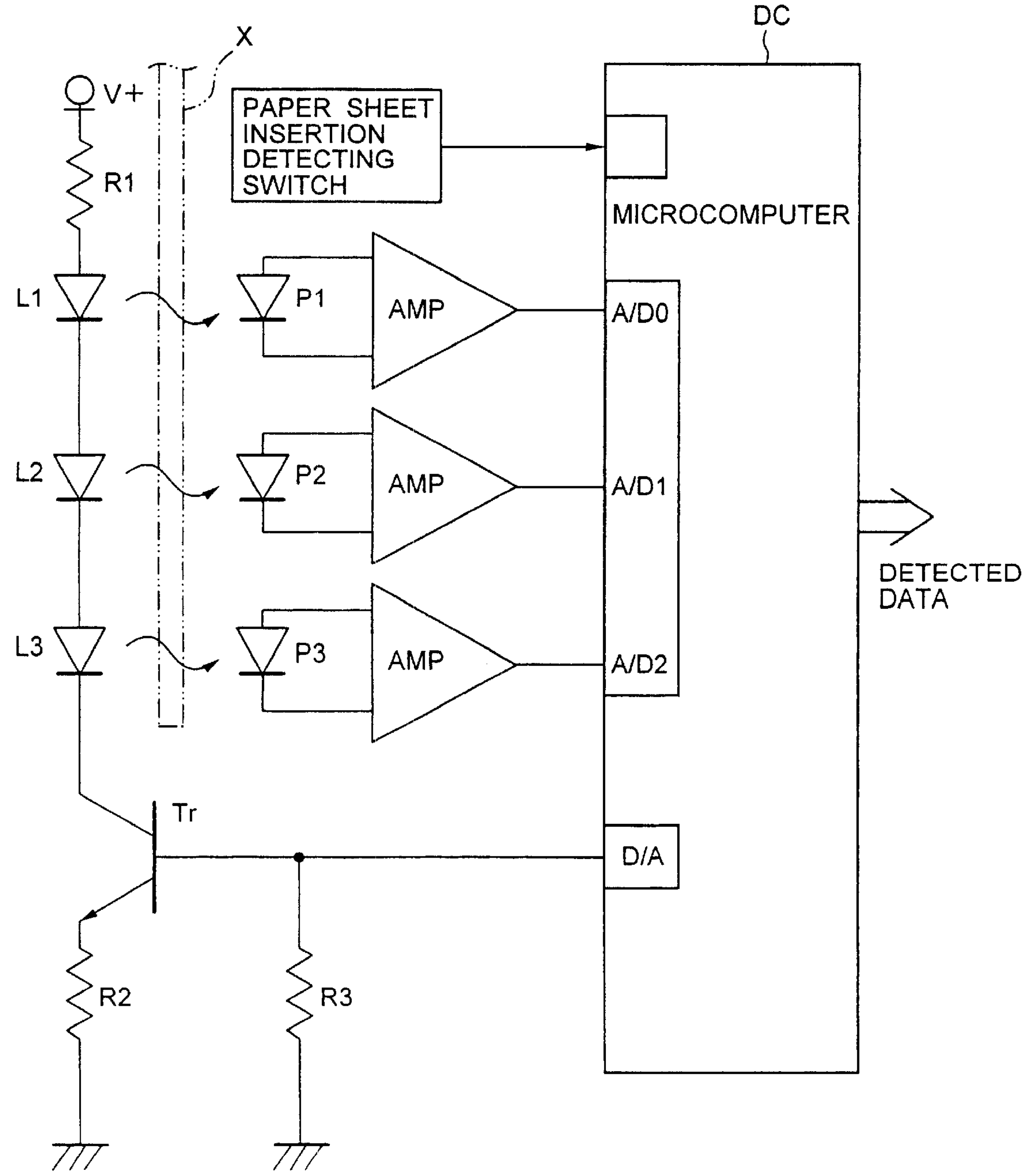

FIG. 1 is a diagram showing one example of a circuit constitution of a light-permeating paper sheet checking apparatus which this invention is applied in. As shown in FIG. 1, in order to detect a paper sheet X, represented by an imaginary line, by using a light-permeating method, light emitting diodes L1 to L3 and light-receiving diodes P1 to P3 are provided on the path which the paper sheet X passes along or at the set position of the paper sheet X.

In the case of, for example, a paper sheet checking apparatus, the light emitting diodes L1 to L3 are arranged in a row between the carrying belts on the carrying path of the paper sheet near the gap which the paper sheet is inserted through. Consequently, permeated light can be detected at three points parallel to the width of the paper sheet. A transistor Tr comprises a single driving element and supplies current to the light emitting diodes L1 to L3.

The light emitting diodes L1 to L3 are connected together in series, one end connecting to a power source V+ via a resistance R1, and the other end connecting to ground via a collector emitter of the transistor Tr and a resistance R2. The base of the transistor Tr, which is connected to ground by a resistance R3, connects to a D/A converting section of a detecting circuit DC which comprises a one-chip microprocessor. The current passing to the transistor Tr is controlled by supplying a base current.

The light-receiving diodes P1 to P3 are provided facing the light emitting diodes L1 to L3 so as to form respective pairs. The current output after detecting the lights which have permeated the paper sheet X is supplied via amplifiers AMP to the A/D converting sections of the detecting circuit DC. The detecting circuit DC processes the detected signals from the light-receiving diodes P1 to P3 and, based on the detected signals, drives the transistor Tr so as to control the current passing to the light emitting diodes L1 to L3. A paper sheet insertion detecting switch is connected to the detecting circuit DC, and is reset each time a paper sheet is inserted, thereby detecting each new paper sheet.

Figure 2:
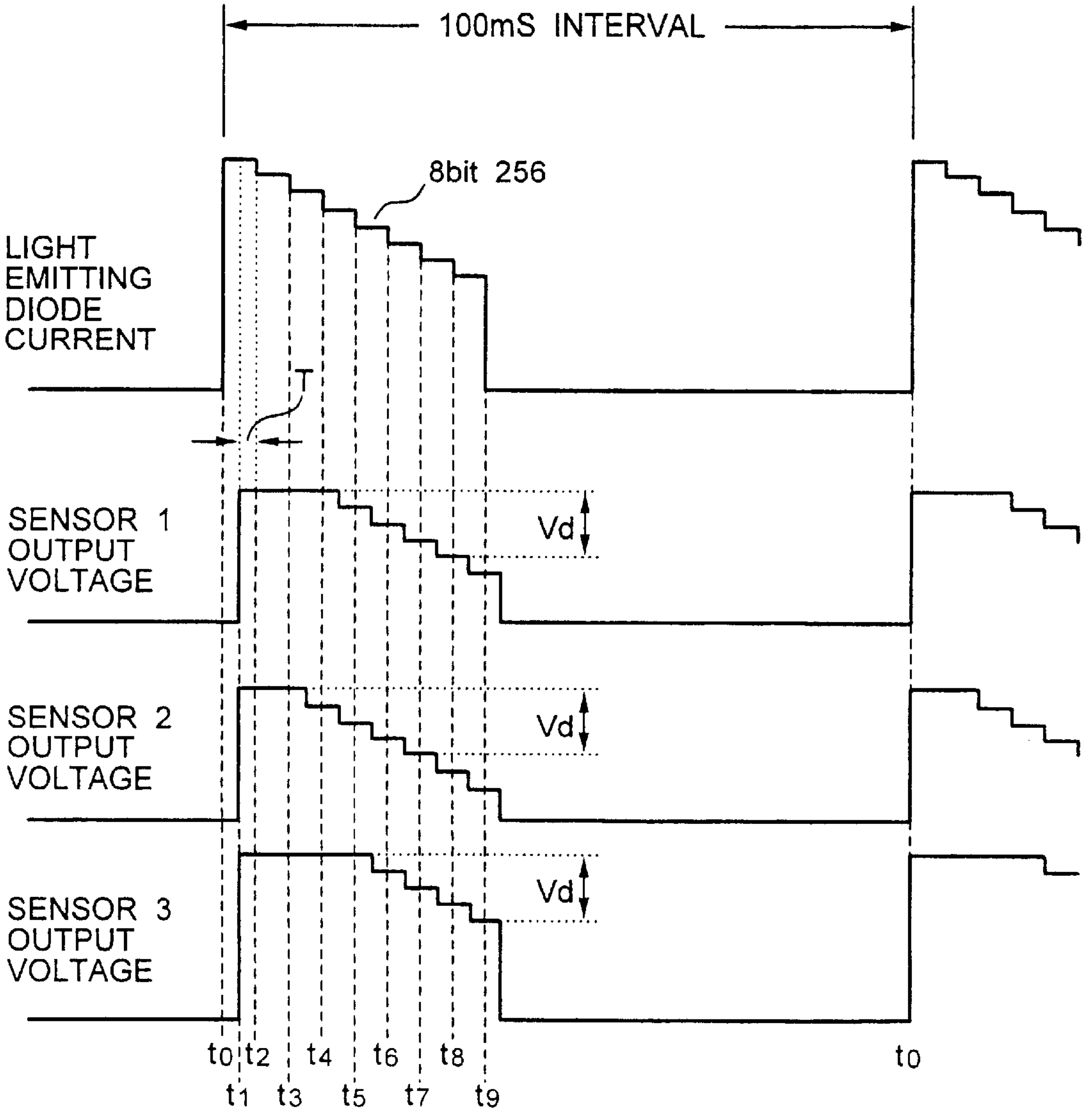
FIG. 2 is a timing chart showing a method of supplying current which is carried out by a detecting circuit DC in order to adjust the standby times of optical sensors in this invention.

FIG. 2 is a timing chart showing a current-passing method used by the detecting circuit DC in this invention to adjust the standby times of optical sensors, i.e. the sensors comprising pairs of light emitting diodes and light-receiving diodes. In this invention, a maximum current is firstly applied to the light emitting diodes, and the maximum value of an output voltage (i.e. maximum output voltage), which is created based on the currents detected by the light-receiving diodes at that time, is measured. Then, the current is decreased in stages, and the point at which the output voltages of the light-receiving diodes have dropped more than a predetermined value below the maximum output voltage is deemed to be the optimum adjusted state. Therefore, the currents passing through the light emitting diodes in the optimum adjusted state are detected and stored. These are the optimum adjustment values of the light sensors, and this adjustment is carried out every 100 mS.

That is, the detecting circuit DC applies the maximum current to the light emitting diodes L1 to L3 at the start tO of the 100 mS intervals. The value of the maximum current is slightly higher than that detected by the light-receiving diodes P1 to P3. Therefore, after detecting the lights generated by the light emitting diodes L1 to L3 at time t1, the light-receiving diodes P1 to P3 always output the maximum values. The maximum values are supplied via the amplifiers AMP and stored in the detecting circuit DC.

Subsequently, at time t2, the detecting circuit DC reduces the current passing to the light emitting diodes L1 to L3 in stages. In the first stage, the current is reduced by 1/256 of the maximum current of the light emitting diodes, which is 30 mA. The current is reduced by another stage at time t3.

In this way, the detected outputs of the light-receiving diodes P1 to P3 are measured while reducing the current passing to the light emitting diodes L1 to L3. Ordinarily, the light-receiving diodes P1 to P3 have different characteristics. Therefore, when current is first passed to the light emitting diodes L1 to L3, all the light-receiving diodes P1 to P3 output at their maximum values, but their outputs start to decrease at a certain stage. The light-receiving diode P1 starts to decrease between times t4 and t5, the light-receiving diode P2 starts to decrease between times t3 and t4, the light-receiving diode P3 starts to decrease between times t5 and t6, and each decreases one stage at a time thereafter. The corresponding light-receiving diodes are generating optimum levels of light when the outputs of the light-receiving diodes P1 to P3 have decreased by a predetermined value, that is, when their outputs have decreased by precisely a voltage difference Vd. The current passing through the light emitting diodes L1 to L3 has its optimum value at this point.

Since the outputs of the optical sensors start to decrease at different times, the light-receiving diodes P1 to P3 also attain their optimum currents at different times. The light-receiving diode P1 attains optimum current between times t8 and t9, the light-receiving diode P2 attains optimum current between times t7 and t8, and the light-receiving diode P3 attains optimum current after time t9. The detecting circuit DC stores the optimum current values separately. When the optimum currents of all the optical sensors have been detected, the detecting circuit DC cuts-off the current to the light emitting diodes L1 to L3 and goes to standby for a new adjustment 100 mS later.

As a result, the detecting circuit DC always controls the current passing to the light emitting diodes L1 to L3 so as to suit the detected characteristics of the light-receiving diodes P1 to P3.

Figure 3:
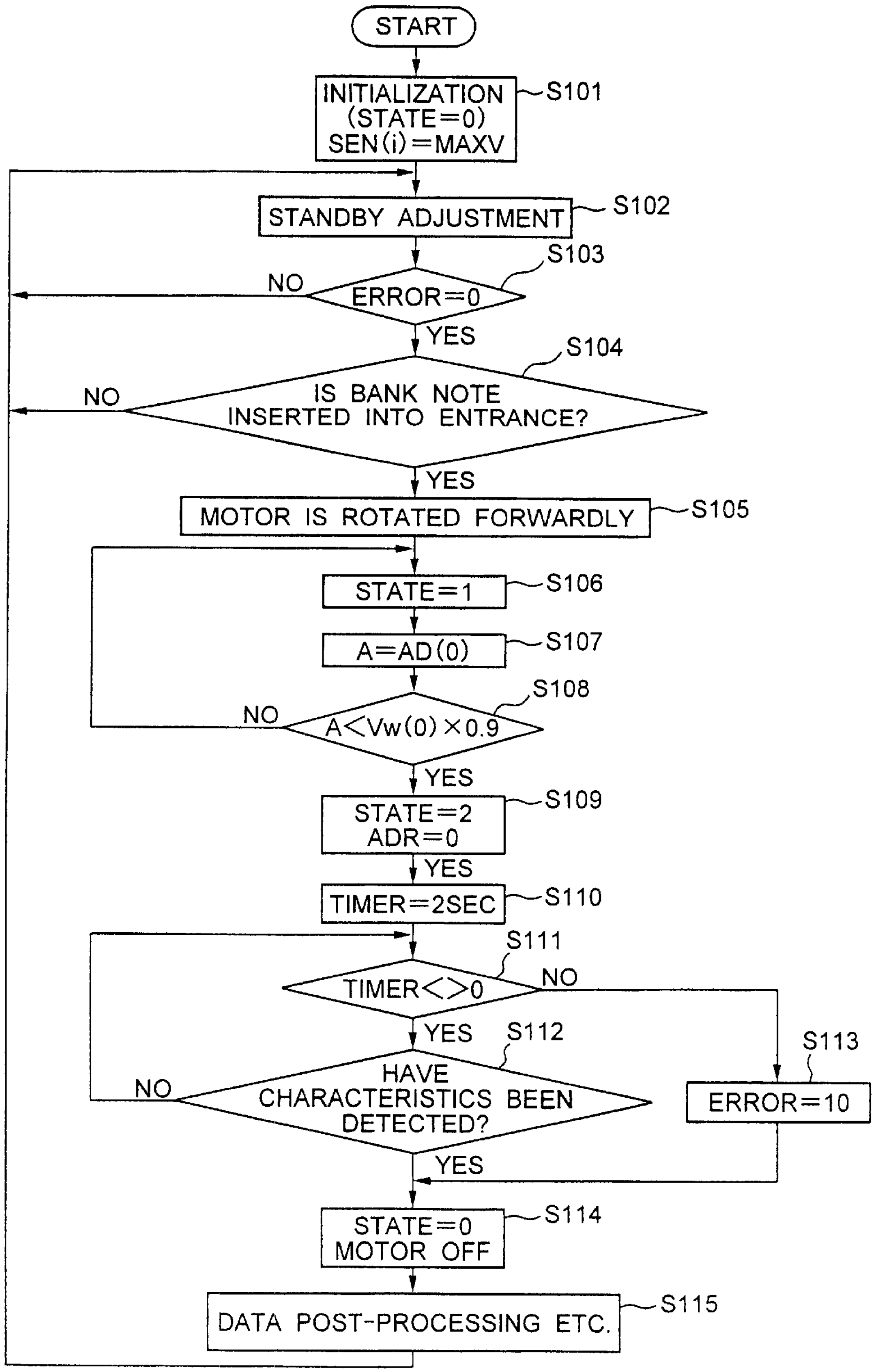
FIG. 3 is a main flowchart showing an operation of the paper sheet checking apparatus according to this invention.

FIG. 3 is a main flowchart showing an operation of the paper sheet checking apparatus according to this invention. This example shows a case where a bank note is checked. At power-on, initialization is carried out in step S101. Initialization comprises initializing the various types of flags and CPU ports, and storing the corresponding values of the sensors of the D/A converter as maximum values.

After initialization, the standby adjustment explained in FIG. 2 is performed in step S102 (the flow of this operation will be explained in detail later using FIG. 4). When the standby adjustment has ended, it is confirmed in step S103 that the detecting circuit DC is operating normally. When the detecting circuit DC is found to be operating irregularly, the sequence returns to step S102 and standby adjustment is carried out a second time. When the detecting circuit DC is confirmed to be operating normally, the sequence shifts to step S104.

When the bank note is inserted into the entrance of the detecting apparatus, the apparatus shifts from standby to an operative state (step S104). In step S105, a motor for carrying is forwardly rotated, thereby delivering the bank note into the apparatus. As the bank note starts to enter, the checking apparatus changes to "state=1" in step S106. In step S107, the 0-channel data of the A/D converter is extracted as a virtual measurement.

Subsequently, the sequence shifts to step S108 in which it is determined whether the measurement A of the amount of permeated light has decreased slightly after checking the bank note, i.e. whether "measurement A<Vw (0)×0.9". Vw is the measurement obtained during standby when there is no bank note in the apparatus, it being determined that a bank note has been inserted when the measurement A has decreased to less than 90% of the standby measurement Vw. The sequence repeatedly returns to S106 until such a measurement A is obtained.

When it has been determined that the bank note has been inserted, in step S109 the apparatus shifts to "state=2" wherein the signal is processed in compliance with an interrupt pulse which is generated in linkage with the rotation of the bank note delivery motor. (This signal processing will be explained later based on FIG. 5.) At this point, ADR=0 and the measurement position of the bank note is set to a reference position of "0".

With the addition of a margin the time required for this processing is regarded as two seconds, and instep S110, the timer is set to two seconds. When the bank note has been checked within two seconds, the sequence shifts to the next process. On the other hand, when the check has not been completed within two seconds, an error is deemed to have occurred and processing is cancelled.

In step S111, it is determined whether two seconds have elapsed, and in step S112, data processing for detecting the characteristics of the bank note is carried out within two seconds. When the characteristics have been detected the checking apparatus is set to "state=0" instep S114, whereby the checking apparatus ends the authentication of the bank note and stops the motor for carrying. The operation shifts to step S115, in which necessary processes such as carrying the bank note and data post-processing are performed, and the checking apparatus reassumes the standby state of step S102.

On the other hand, when the timer exceeds two seconds in step S111, the bank note is regarded as having become stuck and error processing is carried out in step S113. In step S114, the apparatus is set to "state=0" and the motor is turned OFF. Following processing for returning an note which has got stuck in step S115, the apparatus reassumes the standby state.

Figure 4:
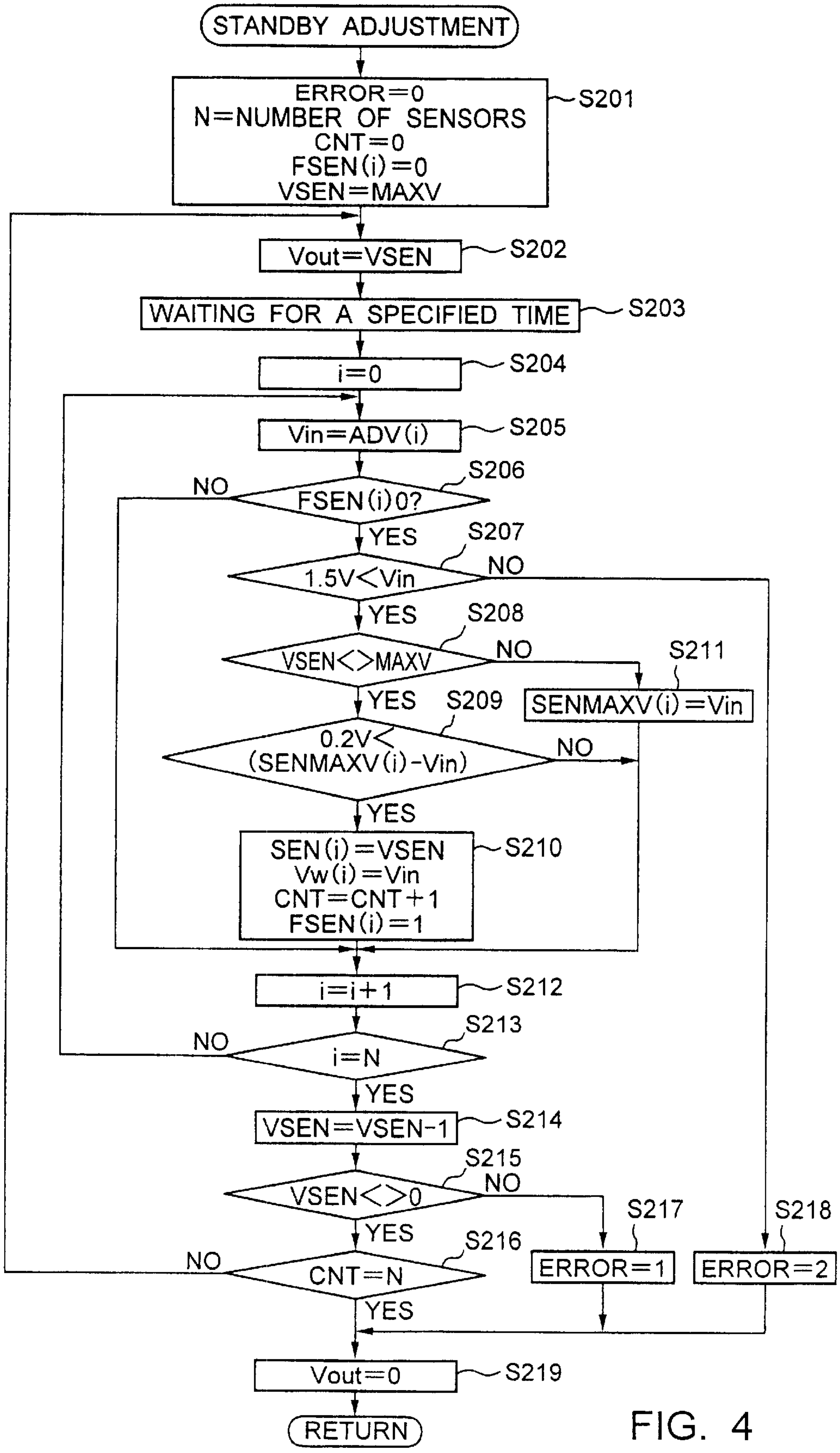
FIG. 4 is a flowchart showing contents of an operation in standby shown in the step S102 of FIG. 3.

FIG. 4 is a flowchart showing the contents of n operation in the standby state shown in step S102 of FIG. 3. This flowchart shows an adjustment of the output of the optical sensors of the checking apparatus whose constitution was shown in FIG. 1 and operation was shown in FIG. 2.

In step S201, all sections of the apparatus are set to the initial settings. This comprises (a) setting ERROR=0, i.e. clearing the return error data; (b) setting N=number of sensors, i.e. the number of optical sensors; (c) setting CNT=0, i.e. setting the counter which counts the number of adjusted sensors to zero; (d) setting FSEN (i)=0, i.e. setting the adjustment completion flags of all the optical sensors to zero; and (e) setting VSEN=MAXV, i.e. setting the output of the D/A converter in the detecting circuit DC (FIG. 1) to its maximum, e.g. "255" in the case where there are eight bits.

In a subsequent step S202, Vout=VSEN, i.e. the D/A converter outputs its maximum. Instep S203, a specified waiting time is provided. This is because the time of approximately 20 μseconds from the output of the D/A converter until the light-generation of the light emitting diodes, the light-reception of the light-receiving diodes, and the value of the light received by the light-receiving diodes have reached stable saturation, is deemed a waiting time.

When this time has elapsed, in step S204 i=0, i.e. a state where the optical sensor to be measured is 0th. From step S205 onwards, each of the optical sensors is adjusted. In step S205, Vin=ADV (i), i.e. the output voltage of optical sensor number i is extracted. In this case, "number i" is number zero, and in the subsequent steps S206 to S213, the output voltages are sequentially extracted from the 0th optical sensor to the Nth.

In step S206, it is determined whether FSEN (i)=0, i.e. whether the sensor has not yet been measured. When the sensor has not yet been measured, it is determined in step S207 whether the measured voltage Vin is greater than a predetermined value (e.g. 1.5 V). The predetermined value denotes the minimum voltage at which it is possible to guarantee precise measuring. When the measured voltage Vin is less than the predetermined value, adjustment is deemed to be impossible due to dirt and the processing shifts to step S218 without measuring. Then, in step S219, the output Vout is set to zero in order to stop the light emitting diodes from generating light.

When the measured, voltage Vin is greater than 1.5 V, the process shifts to step S208 in which it is determined whether the output voltage VSEN of the D/A converter is the maximum value of the 256 stages. When it is the maximum, the level of light received at that point is stored in step S211. In step S212, i is incremented to i+1 so as to proceed to the first optical sensor. In step S213, after confirming that this optical sensor is not the Nth optical sensor, the sequence returns to step S205.

When the voltage VSEN of the D/A converter which is measured while repeating the operations from steps S205 to S208 is not the maximum value MAXV, in step S209 it is determined whether a value obtained by subtracting the measured voltage Vin from the maximum level of received light SENMAX (i) is greater than 0.2 V. When it is greater, the adjustment point is deemed to have been reached and the process shifts to step S210.

In step S210, four items are set: (a) SEN (i)=VSEN, whereby the output voltage of the D/A converter is stored as an optimum voltage for the optical sensor number i (in this case, the first optical sensor); (b) setting the measured voltage as the standby voltage Vw of each sensor; (c) adding "1" to the counted value (CNT=CNT+1) of the counter representing the optical sensor to be adjusted; and (d) setting the flag of the adjusted sensor number i (in this case, the first sensor) to "1".

As described above, in step S212, the next optical sensor is specified by i=i+1. This is repeated until the Nth sensor (S213). When the Nth sensor is reached, the operation shifts to step S214. The outputs of all the optical sensors in the stage which is one stage lower than the maximum VSEN output from the D/A converter have now been checked. Subsequently, the outputs of the optical sensors in the stage which is yet another stage lower are checked.

In step S215, it is confirmed that the output voltage VSEN of the D/A converter when reduced by yet another stage is not zero. In step S216, it is confirmed that the value counted by the counter has not reached N. The sequence then returns to step S202 and the above operation is repeated. In this operation, when the value counted by the counter reaches N, thereby indicating that all the optical sensors have been adjusted, the sequence shifts to step S219 and returns to the main flow without supplying power to the light emitting diodes.

Error processing is also performed in step S217 in the case where the voltage VSEN output from the D/A converter was zero. Thereafter, the sequence returns to the main flow.

Figure 5:
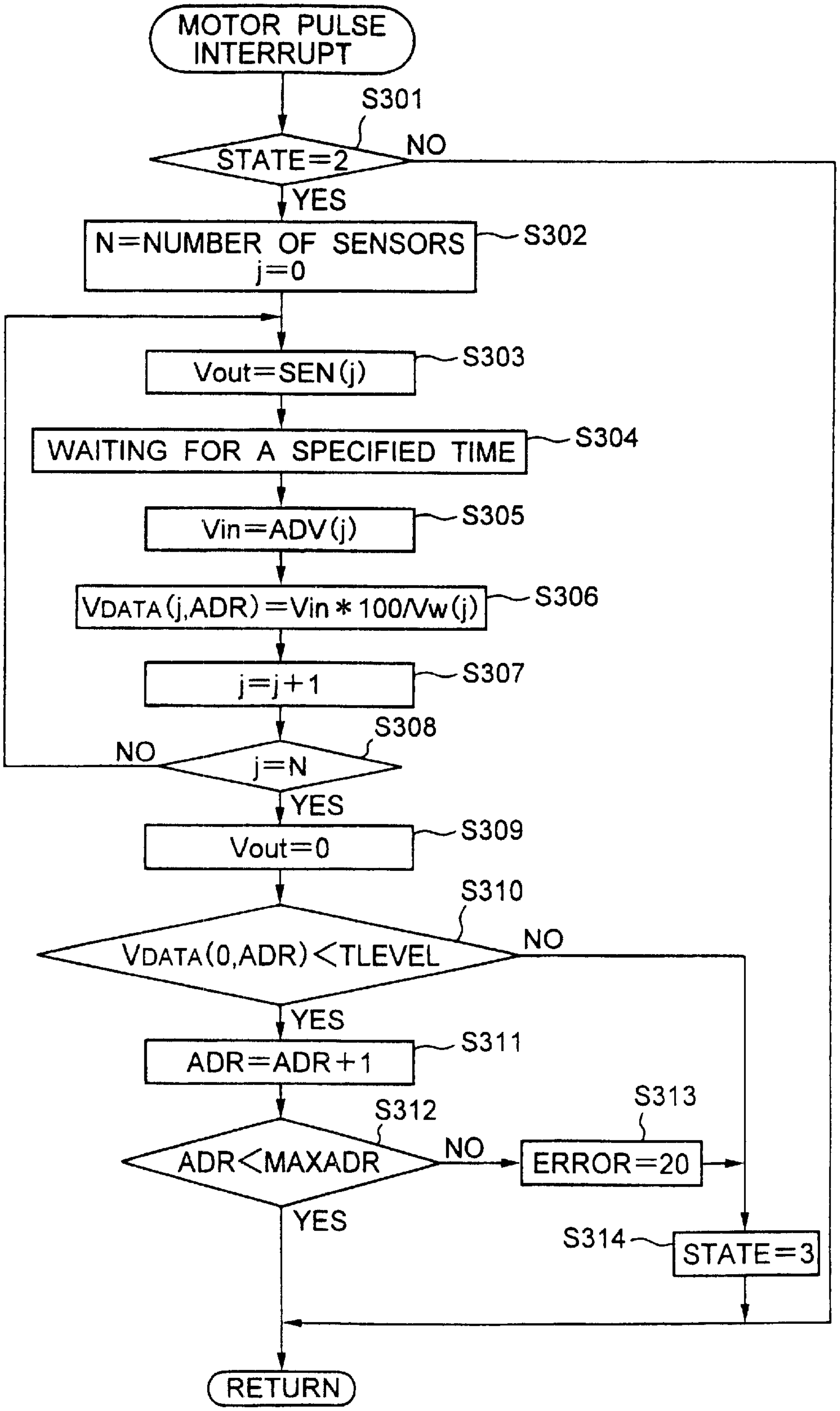
FIG. 5 is a flowchart showing an interrupt performed by a motor pulse of the checking apparatus in the step S109 of FIG. 3.

FIG. 5 is a flowchart showing an interrupt performed by using a motor pulse of the checking apparatus in step S109 of FIG. 3. As shown in this flowchart, when the motor for carrying the bank notes rotates, the checking apparatus interrupts at the rise of a pulse generated by a pulse generator which operates in linkage with the motor. The interrupt pulse is generated every time the bank note is carried over a distance of 0.2 to 0.5 mm.

When the motor for carrying rotates, in a step S301 it is determined whether the state=2, i.e. whether it is the state for carrying out the motor pulse interrupt. When the state is confirmed to be that for carrying out an interrupt, the number of optical sensors to be identified is set to N in step S302 and the sensor number j is set to zero.

Processing then shifts to the operations from step S303 onwards. In step S303, Vout=SEN (j), i.e. the D/A converter outputs the voltage SEN (j) which corresponds to the optimum light emitting current of each sensor stored at standby as described in FIG. 4. Instep S304, a predetermined waiting time is provided to wait for the light-receiving levels of the light-receiving diodes to become stable.

The measurement ADV (j) of the optical sensor number j of the A/D converter is entered as the measurement Vin. Subsequently, the following calculation is calculated in step S306

$$VDATA(j, ADR)=Vin*100/Vw(j)$$

whereby the measurement is converted to permittivity. After conversion, the permittivity is stored at the address of each optical sensor.

By this process the measurement data of, for example, the first optical sensor is stored as permittivity data, and a measurement is extracted from the next optical sensor. That is, in step S307, j is incremented to j+1, and in step S308, the measurement for the subsequent second optical sensor is stored unless j=N.

When the permittivity data of all the optical sensors has been stored, Vout is set to zero in step S309, thereby ending the passage of current to the light emitting diodes. In step S310, it is confirmed whether VDATA (0, ADR)<TLEVEL, i.e. whether the bank note has not reached its final position and measuring should continue.

When the bank note has not reached its final position, ADR is incremented to ADR+1 in step S311 in preparation for measuring the next position of the bank note and storing the measurement data. In step S312, it is determined whether ADR<MAXADR, i.e. whether the maximum length of the bank note has been reached. When it has not been reached, processing returns to the main flow.

When the maximum length of the bank note has been reached, the bank note is regarded as being too long and the sequence shifts to step S313 for an error process. In step S314, the end of the operation is indicated by state=3 and the sequence returns to the main flow. The sequence also shifts to step S314 and returns to the main flow after state=3 when the final position of the bank note has been reached in step S310.

In the embodiment described above, the paper sheets comprise bank notes, but this invention can be applied in authenticating gold notes, coupons, and the like.

The above embodiment comprises a light-permeating system, but may comprise a light-reflecting system instead.

In the above embodiment, the light emitting elements are connected in series, but they can be connected in parallel and driven by a single driving unit.

Technical Advantages

As described above, according to this invention, in identifying a pattern printed on a paper sheet based on optically detected data extracted from the paper sheet by using optical sensors comprising light emitting elements and light-receiving elements, a predetermined maximum current is supplied to each light emitting element while the paper sheet is not being checked and the current is decreased in stages, whereby the current output from the light-receiving elements decreases by a predetermined value each time. The value of current when the output of the light-receiving elements are decreased from the value at maximum passage of current by a predetermined value is stored as an optimum, and is used as the current supplied when checking the paper sheet. Therefore, the optical sensors can always be kept in an optimum state and light which is permeated through the paper sheet in order to detect optical characteristics thereof can be detected with stability.

Reference Numerals

L light emitting diode

P light-receiving diode

AMP amplifier

DC detecting circuit

R resistance

Tr Transistor

A/D analog/digital converter

D/A digital/analog converter

Vd specified value

What is claimed is:

1. An optical paper sheet checking apparatus comprising:

a plurality of optical sensors which output signals obtained by optically detecting a pattern of a paper sheet, the optical sensors comprising light emitting elements and light-receiving elements;

a driving unit which supplies a current to said light emitting elements in said plurality of optical sensors in accordance with a control signal; and a controlling unit which, while said paper sheet is not in a predetermined position, (a) supplies a maximum current having a predetermined value to said light emitting elements and thereafter supplies said control signal to said driving unit so as to decrease the supply of current, (b) determines and stores optimum values for each of said plurality of optical sensors, each of said optimum values being a value of current being supplied when the output voltage of said light-receiving elements has changed by a predetermined value relative to a value of said output voltage said maximum current, (c) when said paper sheet is at said predetermined position, supplies said control signal to said driving unit based on each of said optimum values which have been stored, (d) selectively extracts said detected signals from said optical sensors and outputs detected data representing the pattern of said paper sheet.

2. The optical paper sheet checking apparatus as described in claim 1, further comprising a detecting unit which detects whether said paper sheet is at said predetermined position.

3. The optical paper sheet checking apparatus as described in claim 1, wherein said light emitting elements in said plurality of optical sensors are connected together in series or in parallel and current is supplies thereto by a single driving unit.

4. The optical paper sheet checking apparatus as described in claim 1, wherein said controlling unit reduces the supply of current to said light emitting elements in stages from said maximum current at predetermined time intervals while said paper sheet is not at said predetermined position.

5. The optical paper sheet checking apparatus as described in claim 4, wherein, when reducing the supply of current to said light emitting elements in stages from said maximum current at predetermined time intervals, said controlling unit extracts an output voltage of said light-receiving elements at a predetermined point during said predetermined time interval.

6. The optical paper sheet checking apparatus as described in claim 1, wherein, when said paper sheet is not at said predetermined position, said controlling unit supplies said maximum current to said light emitting elements, reducing the supply of current, and, deeming said optimum value to be the supply of current when the output voltage of said light-receiving elements has changed by said predetermined value relative to the value of said output voltage when said maximum current was supplied, determines and stores said optimum value for each of said plurality of optical sensors, said controlling unit repeating this operation according to a predetermined time cycle.

* * * * *